(No Model.)
G. F. NEALE.
GLASS FINISHING MACHINE.
No. 419,468. Patented Jan. 14, 1890.
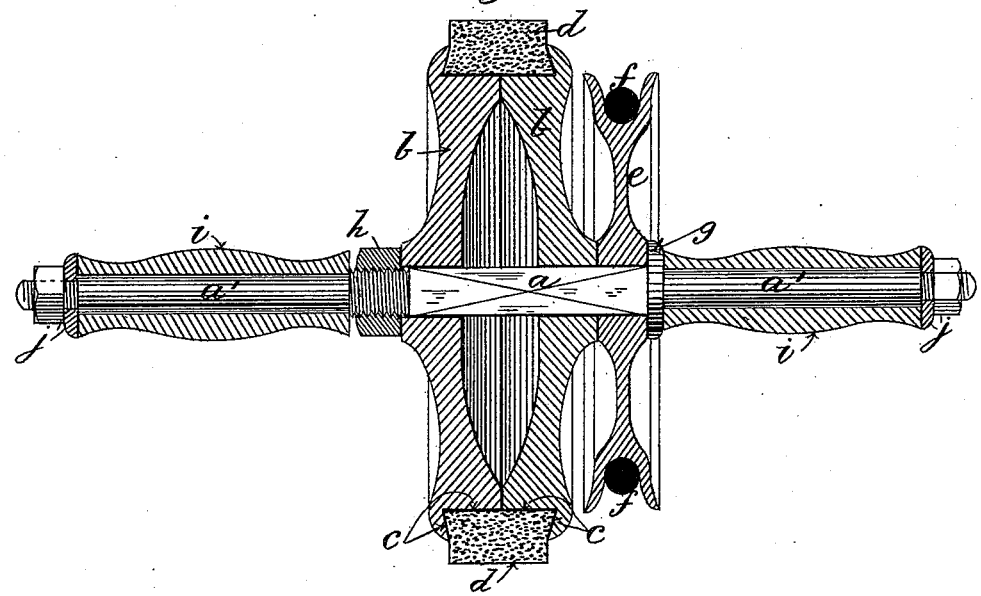
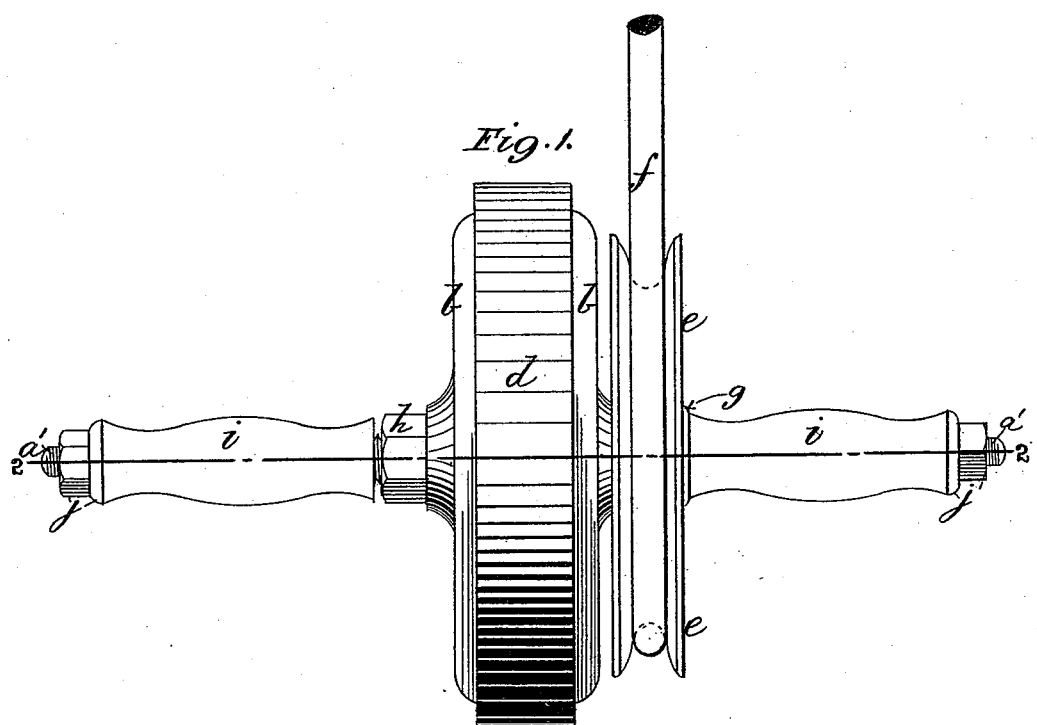
WITNESSES
J. W. Crookes
Paul Bakewell
INVENTOR
George F. Neale
by Paul Bakewell
his attorney

UNITED STATES PATENT OFFICE.

GEORGE F. NEALE, OF CRYSTAL CITY, MISSOURI.

GLASS-FINISHING MACHINE.

SPECIFICATION forming part of Letters Patent No. 419,468, dated January 14, 1890.

Application filed September 24, 1889. Serial No. 324,902. (No model.)

*To all whom it may concern:*

Be it known that I, GEORGE F. NEALE, a citizen of the United States, residing at Crystal City, in the county of Jefferson, State of Missouri, have invented a certain new and useful Improvement in Glass-Finishing Tools, of which the following is a full, clear, and exact description.

My invention relates to an improved tool for finishing plate-glass, which when it leaves the large machines is more or less imperfect, rendering it sometimes necessary to repass the plates through the large machines for effecting a perfect polishing, and thereby causing a great waste of time.

My invention has for its object to obviate this difficulty by effecting a rapid and easy polishing or finishing of the plates without repassing them through the large machines. The invention consists in a polishing ring or wheel and pulley secured to a shaft on which are loose handles, the whole constituting a tool to which power may be applied by an elastic belt, the loose handles serving as bearings for the rotating shaft, as well as means for guiding the tool, the elasticity of the driving-belt permitting the tool to be used at any point on the surface of the glass where any other detached tool would be used.

On the accompanying drawings, Figure 1 represents my improved glass-polishing tool in elevation, and Fig. 2 a longitudinal section thereof on line 2 2 in Fig. 1.

Like letters of reference denote like parts in both figures.

In carrying out my invention I use a shaft or spindle having preferably a square central portion $a$ and two circular end portions $a'$. On the square part $a$ are mounted two disks $b$, of equal diameter, having square central holes fitting the square part $a$ of the spindle, and formed entirely around their peripheries with right and left handed recesses $c$, respectively, which are preferably of a semi-dovetail shape, so that when the disks $b$ are brought together side by side at their peripheries the recesses $c$ will join and hold between them the correspondingly-shaped portion of a circular ring or band $d$, which is composed of felt, emery, or other suitable glass-polishing material. On the square portion $a$ of the spindle is also mounted a pulley $e$, which is grooved on its circumference for receiving a preferably round elastic rubber belt $f$, driven from any suitable overhead motor. The pulley $e$, which is located between a fixed collar $g$ on the spindle and the adjacent disk $b$, is formed with a square central hole fitting the square part $a$ of the spindle. The disks $b$, with the intervening polishing ring $d$, as well as the pulley $e$, are held firmly together on the square part $a$ of the spindle against the fixed collar $g$ by a nut $h$ or otherwise, as preferred. Around the circular end portions $a'$ of the spindle are loosely fitted handles $i$, of any suitable material, which are held in place endwise by nuts and washers $j$ or other device.

In operation, the tool being held by the loose handles $i$ and rotary motion imparted by the elastic belt $f$ to pulley $e$, and thereby to the polishing-ring $d$, the operator is enabled, through the extensibility of the driving-belt, to apply the polishing-wheel with any desired force at any angle and to guide the tool so as to bring the periphery of the polishing-ring $d$ to bear upon any part of the glass plate which it is desired to polish or finish in like manner to the use of any other detached polishing-tool. By my invention slight imperfections are removed from the glass more thoroughly and in much less time than is done by what is known as "hand-blocking."

I am aware that rotating polishing-tools provided with handles for guiding the same have heretofore been mounted on pivoted and journaled frames, and do not herein claim such machines, as the same are necessarily limited in their application or range by the non-extensibility of the frames in which they are mounted and the non-elasticity of the driving-belts.

I claim as my invention—

1. A polishing-tool for finishing polished surfaces, said tool composed of a shaft having a polishing-wheel and pulley attached thereto, and handles loosely journaled on the shaft to the outside of said polishing-wheel and pulley, substantially as and for the purposes described.

2. In a polishing-tool, the combination, with a polygonal shaft having journal ends, of two clamping-disks having dovetailed recesses at their peripheries and polygonal shaft-holes, a pulley secured to the shaft, and handles loosely journaled on the shaft, substantially as and for the purposes described.

In testimony whereof I have affixed my signature, in presence of two witnesses, this 17th day of September, 1889.

GEO. F. NEALE.

Witnesses:
    LOUIS PHILLIPPI,
    FRED BUTLER.